United States Patent [19]

Kim

[11] Patent Number: 5,021,275

[45] Date of Patent: Jun. 4, 1991

[54] ORNAMENTAL STICKERS NECESSITATING NO SEPARATE CUTTING PROCESS AND THE MANUFACTURING METHOD THEREOF

[76] Inventor: Jae-Duck Kim, 467-1 Yong Gea-Dong, Dong-gu, Taegu 630-75, Rep. of Korea

[21] Appl. No.: 334,203

[22] Filed: Apr. 6, 1989

[51] Int. Cl.[5] .......................... D06N 7/04; B32B 3/16

[52] U.S. Cl. .......................................... 428/42; 428/40; 428/41; 428/202; 428/914; 428/79; 428/211; 428/207; 428/354; 428/343; 428/422; 428/447

[58] Field of Search .................. 428/40, 41, 202, 914, 428/79, 211, 207, 354, 343, 422, 447, 42

[56] References Cited

U.S. PATENT DOCUMENTS

| | | | |
|---|---|---|---|
| 4,028,165 | 6/1977 | Rosenfeld | 428/207 |
| 4,028,474 | 7/1977 | Martin | 428/40 |
| 4,033,918 | 7/1977 | Hauber | 428/449 X |
| 4,038,123 | 7/1977 | Summis | 428/914 X |
| 4,044,181 | 8/1977 | Echlund | 428/40 |
| 4,054,697 | 10/1977 | Reed et al. | 428/40 |
| 4,232,076 | 11/1980 | Stetson et al. | 428/914 X |
| 4,278,483 | 7/1981 | Mansolillo | 428/207 X |
| 4,409,280 | 10/1983 | Wiley et al. | 428/159 |
| 4,599,264 | 7/1986 | Kauttman et al. | 428/336 X |
| 4,605,592 | 8/1986 | Paquetle et al. | 428/424.4 X |
| 4,626,460 | 12/1986 | Duncan | 428/354 |
| 4,759,968 | 7/1988 | Janssen | 428/354 |

FOREIGN PATENT DOCUMENTS

| | | | |
|---|---|---|---|
| 1299948 | 12/1972 | United Kingdom | 428/40 |

*Primary Examiner*—Ellis P. Robinson
*Assistant Examiner*—William P. Watkins, III
*Attorney, Agent, or Firm*—Lieberman, Rudolph & Nowak

[57] ABSTRACT

An ornamental sticker having a configuration in which an adhesive layer, a basic plate layer, and a multicolored printing layer are formed as one body to make an applique sheet, which sticker requires no separate cutting process in the manufacturing thereof, and which sticker is available for various uses of industrial purposes as well as reuse.

9 Claims, 2 Drawing Sheets

ORNAMENTAL STICKERS NECESSITATING NO SEPARATE CUTTING PROCESS AND THE MANUFACTURING METHOD THEREOF

BACKGROUND OF THE INVENTION

This invention relates generally to ornamental stickers and the manufacturing method thereof, and more particularly to a sticker made of synthetic resin which is highly decorative and of superior quality. Advantageously, the sticker, according to the present invention, requires no additional cutting process to produce the final product and can provide, in particular, a double-sided decorative effect when applied to transparent, even-surfaced articles, such as plate glass.

To meet the above ends, the present sticker is embodied in a configuration in which the adhesive layer and the basic plate are formed in the shape of a desired design on an applique sheet by means of a silk screen process. On said basic plate is fixed a multicolored printing layer, with a heat treatment for every one color printing application, combining thereby said adhesive layer, basic plate and printing layer as one integral body to make the applique sheet. With this configuration, therefore, no separate cutting process is required to produce a final product.

DESCRIPTION OF THE PRIOR ART

In conventional stickers created by known techniques, the substance material of a sticker, generally vinyl or paper-like material, is attached, over the whole face of the material, to a sheet covered by adhesives, and the entire upper face of the said substance material is printed with desired patterns. Thus, conventional stickers inevitably require an additional cutting process according to each pattern, since the printing process is performed as a whole regardless of the shape of each desired pattern.

In such conventional stickers, it is very important that the outer margin be precisely cut along the desired design to achieve resultant high quality product. However, due to the fact that it is very difficult to obtain the necessary delicate cutting tools used in such cutting processes, often the cutting process is not performed effectively, causing the final product to be inferior in quality. Moreover, highly skilled technicians are required to operate such cutting tools in order to achieve the goal of precise cutting, resulting in higher labor costs and, thus, significantly increasing the cost of the final product.

Another disadvantage is that since the desired design is printed on the surface of the substance material, the print may stick to any object coming in contact with the design, or frequently peel off, owing to the differences in the physical properties between the print and the substance material.

A still further disadvantage of such conventional stickers is the simple lamination of the substance material, namely the basic plate, and the adhesives. With such a simple laminating technique, when the sticker is detached from a surface for purposes of reuse, often some of the adhesive remains on the surface as the sticker easily expands when removal is attempted. With this disadvantage reuse of the sticker is virtually impossible.

SUMMARY OF THE INVENTION

In view of the foregoing, the object of the present invention is to provide a sticker and manufacturing method therefor, which sticker possesses a highly decorative effect, outstanding persistence, and which inventive sticker is applicable to various industrial purposes as well as reuse. It is an important advantage of the instant invention that in manufacturing the inventive sticker, no separate process of cutting is necessary although the instant sticker has the same superior quality as may be derived from precise cutting techniques.

To achieve these objects, the instant invention is embodied in a configuration in which the adhesive layer, basic plate and multicolored printing layer are arranged in the desired design, laminated to become one body by such means as a silk screen process, heat treated for every one color printing application, and then one final heat treatment to fix the laminates.

These and other objects and features of the invention will be more fully understood by considering the following detailed description of the presently preferred embodiments of the invention, when taken in conjunction with the following drawings.

DETAILED DESCRIPTION OF THE PRESENT INVENTION

Figure 1:
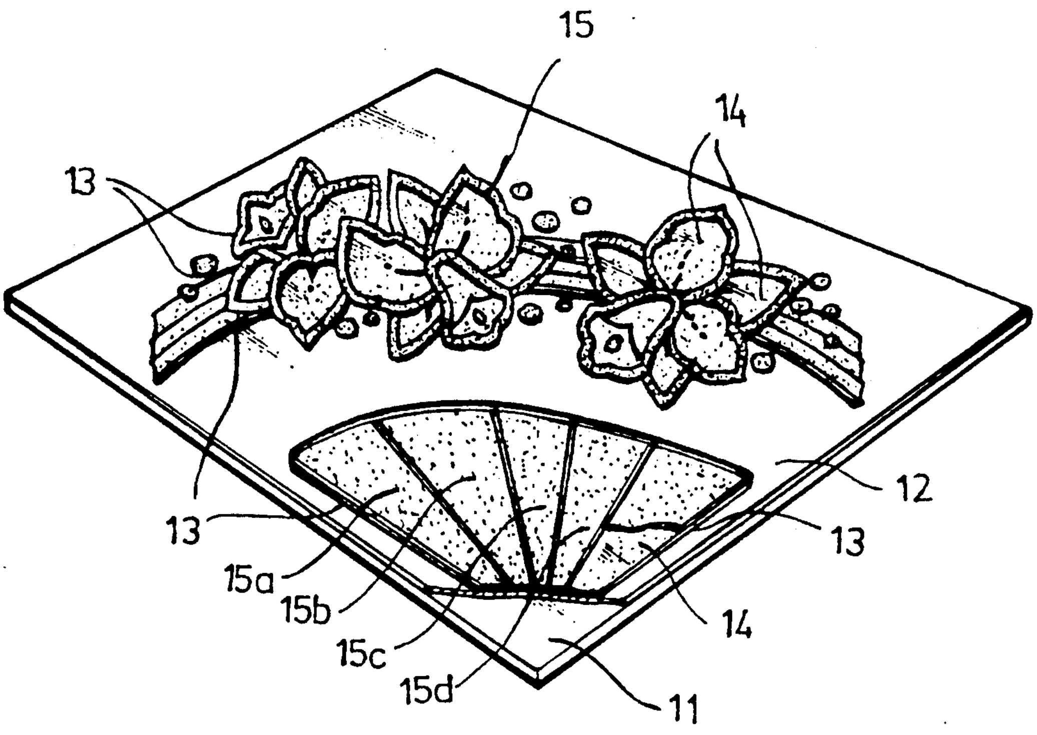
FIG. 1 is a perspective view showing the preferred embodiment of the present invention.
Figure 2:
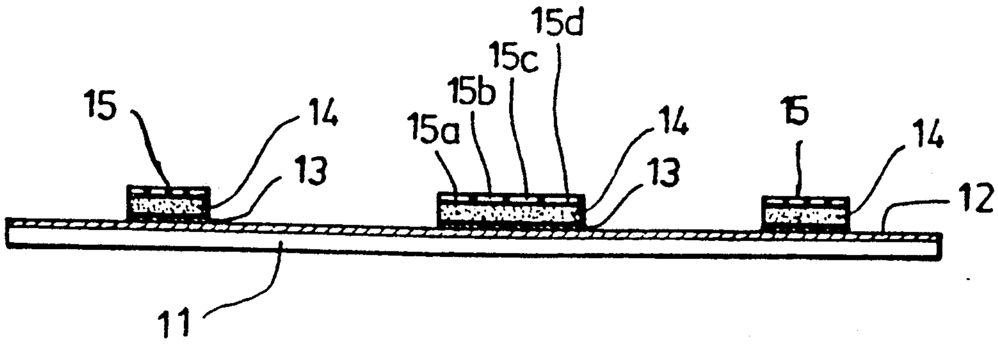
FIG. 2 is a sectional view of FIG. 1.
Figure 3:
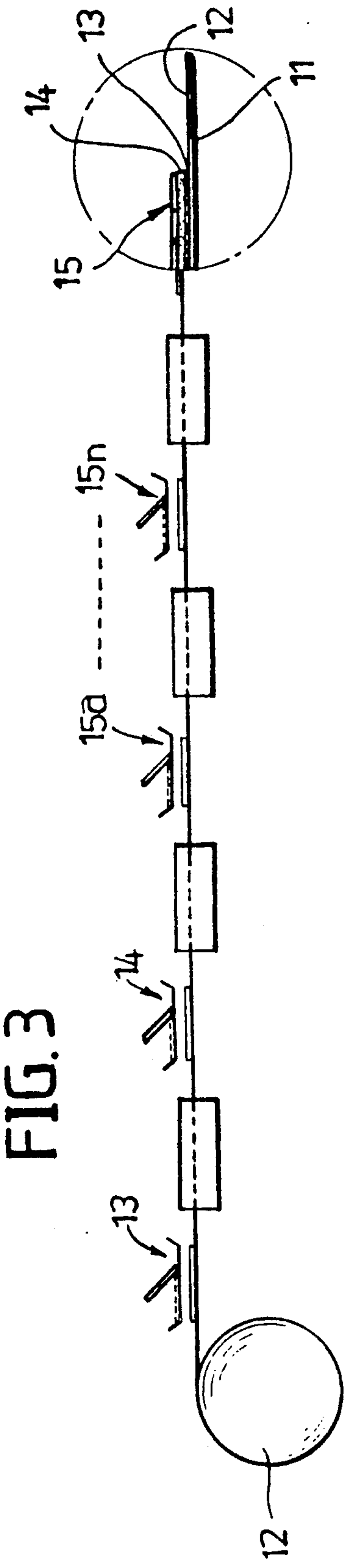
FIG. 3 is an explanatory view showing the procedure of manufacturing a sticker according to the present invention.
Figure 4:
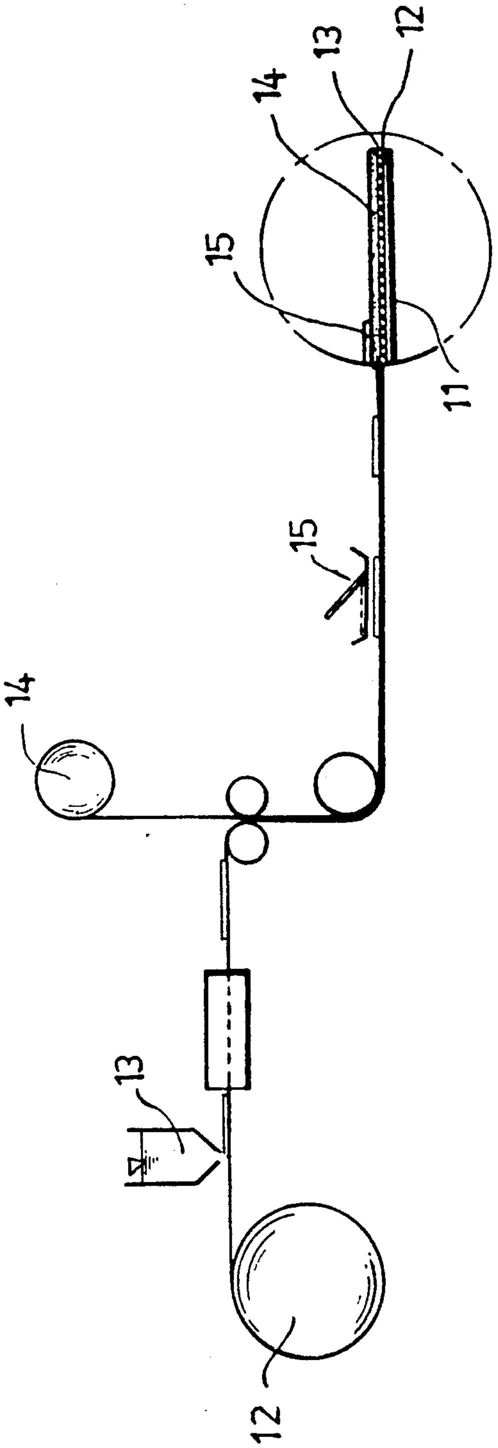
FIG. 4 is an explanatory view showing the procedure of manufacturing a sticker according to the conventional method.

Referring now to FIGS. 1 and 2, the face of sheet 11 is coated with film 12, whereon adhesive 13 is applied in the same shape as a desired design by means of a silk screen process.

Said adhesive 13 may consist of either generally used oily adhesives, or aqueous adhesives comprising an acrylic acid ester polymer. It is preferable, however, to use an aqueous adhesive considering that it is easy to remove any adhesive residue which may remain after removal of the sticker which has been in place for an extended period of time.

When using an aqueous adhesive, it may be difficult to form basic plate 14 on adhesive 13 by any conventional process due to the surface hardening of said adhesive. Special processes may accordingly be required, that is, a mixture of polyvinyl chloride (PVC) and dioctyl phthalate (DOP) is applied on the upper face of adhesive 13 and then a heat treatment at 150°–180° C. is conducted thereover so as to form basic plate 14 in the same shape as the desired design.

In conventional manufacturing methods, oily adhesives are applied over the whole face of a sheet, and dried by a heat treatment, thereby volatizing the solvent constituted therein so as to maintain the surface thereof at a certain stickiness level. Aqueous adhesives are not suitable for this process since they cannot attain the required stickiness level with such methods and, accordingly, fail to obtain a proper adhesion to the basic plate.

In accordance with the instant invention, aqueous adhesive 13 is hardened to produce an irregular, rough surface, whereupon the composition of PVC and DOP is applied by means of a silk screen process to make basic plate 14. Thereafter, a heat treatment at 150°-180° C. is conducted thereover to provide a perfect bond between adhesive 13 and basic plate 14. This bonding eliminates the disadvantage that adhesive 13 may separate from basic plate 14 when the present sticker is detached for the purpose of reuse.

On basic plate 14, printing layer 15 is formed with the mixture of PVC, DOP and certain pigments by utilizing a separate heat treatment for every one color of printing application (15*a*, 15*b* . . . 15*n*). Finally, one additional heat treatment is provided to combine adhesive 13, basic plate 14 and printing layer 15 into one substrate, thereby producing the advantageous sticker of the instant invention.

More specific explanation is given hereafter in accordance with each process of the present manufacturing method.

Sheet 11 is made of a paper like material which can endure a temperature of up to 200° C. Sheet 11 is coated by film 12 comprising teflon or silicone. Such heat resistance of sheet 11 is required because subsequent high temperature heat treatments could cause the undesirable result that the cohesiveness in connection with each layer may be weakened.

Adhesives, preferably aqueous adhesives comprising an acrylic acid ester polymer, are applied on film 12 in a predetermined design by means of a silk screen process to form thereafter adhesive 13 with a predetermined shape.

In the face of adhesive 13, a composition of PVC and DOP by a certain ratio is applied in the same predetermined design, and a heat treatment at 150°-180° C. follows to make basic plate 14. The mixing ratio of DOP may be varied to determine the degree of softness or hardness for basic plate 14 according to the sticker usage. It is preferable to adopt a composition of 100% by weight of PVC and 50-70% by weight of DOP.

In order to form multicolored printing layer 15, printing ink comprising PVC, DOP, pigments and other additives are applied on basic plate 14 as per the design and colors thereof (15*a*, 15*b* . . . 15*n*). During the printing process, a heat treatment of about 150° C. is subsequently applied for every one color of printing application. Thereafter, the final fixing heat treatment is applied to combine adhesive 13, basic plate 14 and multicolored printing layer 15 into one body, and to produce a sticker according to the present invention.

In this configuration, basic plate 14, made of transparent resin, makes a sticker which can give double-sided decoration when applied to a transparent, even-surfaced article such as plate glass.

As per the above description, it is to be understood that the present sticker, as described above, can be applied for reuse without expansion or deformation, when detached from a surface, and does not require an additional cutting process, as well as providing superior decorative effects.

Although there has been shown and described a preferred embodiment of the present invention, it will be appreciated that many changes and modifications may be made therein without, however, departing from the essential spirit and scope of the appended claims.

What is claimed is:

1. A removable and reusable ornamental sticker comprising the following layers:

(a) a sheet of paper-like material, capable of withstanding temperatures of up to 200° C., and coated with a film comprising teflon or silicone;

(b) an adhesive layer formed in a predetermined design by a silk screen process upon said sheet material;

(c) a basic plate layer of resin attached to said adhesive layer and formed in the same predetermined shape as said adhesive layer by a silk screen process; and (d) a colored layer applied to said basic plate layer and comprising a printing ink containing polyvinyl chloride, dioctyl phthalate, and pigments, the colored layer being composed of one or more color components and formed in a predetermined shape by a silk screen process.

2. An ornamental sticker in accordance with claim 1, wherein said adhesive is an aqueous adhesive comprising an acrylic acid ester polymer.

3. A sticker of claim 1, wherein the basic plate layer is transparent.

4. A sticker of claim 1, wherein the colored layer is composed of several color components, each component formed in a predetermined shape by a silk screen process.

5. A sticker of claim 4, wherein a heat treatment is applied for each color component.

6. A sticker of claim 1, wherein the adhesive layer, basic plate layer, and colored layer are combined to form a single substrate by application of a final heat treatment.

7. A sticker of claim 1 which provides a two-sided display when affixed to a transparent surface.

8. A sticker of claim 1 which is removable without a detectable loss of adhesive.

9. A sticker of claim 1, which is washable.

* * * * *